(12) United States Patent
Kuwahara

(10) Patent No.: US 6,202,072 B1
(45) Date of Patent: Mar. 13, 2001

(54) METHOD AND APPARATUS FOR PROCESSING STANDARD GENERALIZED MARKUP LANGUAGE (SGML) AND CONVERTING BETWEEN SGML AND PLAIN TEXT USING A PROTOTYPE AND DOCUMENT TYPE DEFINITION

(75) Inventor: Akira Kuwahara, Tokushima (JP)

(73) Assignee: Jusystem Corp., Tokushima (JP)

( * ) Notice: Subject to any disclaimer, the term of this patent is extended or adjusted under 35 U.S.C. 154(b) by 0 days.

(21) Appl. No.: 08/985,742

(22) Filed: Dec. 5, 1997

(30) Foreign Application Priority Data

May 8, 1997 (JP) .................................................. 9-118257

(51) Int. Cl.[7] .................................................. G06F 15/00
(52) U.S. Cl. ......................... 707/513; 707/500; 707/517
(58) Field of Search ..................... 707/513–523, 707/104, 101, 500–508, 524, 526, 203; 395/707, 111; 345/302

(56) References Cited

U.S. PATENT DOCUMENTS

| 5,752,021 | * | 5/1998 | Nakatsuyama et al. | 395/605 |
| 5,802,529 | * | 9/1998 | Nakatsuyama et al. | 707/513 |
| 5,911,776 | * | 6/1999 | Guck | 707/217 |
| 5,915,259 | * | 6/1999 | Murata | 707/513 |
| 5,920,879 | * | 7/1999 | Kyojima et al. | 707/517 |
| 6,014,680 | * | 1/2000 | Sato et al. | 707/513 |

FOREIGN PATENT DOCUMENTS

| 1-177157 | | 7/1989 | (JP) . | |
| 2183868 | | 7/1990 | (JP) . | |
| 5-101054 | | 4/1993 | (JP) . | |
| 7-028817 | | 1/1995 | (JP) . | |
| 07044560 | | 2/1995 | (JP) . | |
| 07064972 | | 3/1995 | (JP) . | |
| 07160703 | | 6/1995 | (JP) . | |
| 08016576 | | 1/1996 | (JP) . | |
| 08069469 | | 3/1996 | (JP) . | |
| 8-171565 | | 7/1996 | (JP) . | |
| 08221399 | * | 8/1996 | (JP) | 17/24 |

* cited by examiner

*Primary Examiner*—Joseph H. Feild
*Assistant Examiner*—Alford W. Kindred
(74) *Attorney, Agent, or Firm*—Sughrue, Mion, Zinn, Macpeak & Seas, PLLC

(57) ABSTRACT

The apparatus for processing Standard generalized markup language document generates a SGML conversion form file correlating a prototype file having a specific form with document type definition by a SGML conversion form generation module, and converts, in a case where a plain text document prepared using the specific form is converted to a SGML document, the prepared plain text document to the SGML document by referring to the SGML conversion form file in a SGML document generation module, while in a case the reverse conversion is executed, the converted SGML document is reversely converted to the plain text document by referring to the SGML conversion form file in a SGML document read-in module.

11 Claims, 11 Drawing Sheets

| | | | |
|---|---|---|---|
| DATE : | a | b | c |
| NAME | | SEX | |
| BIRTH-DATE | | | d |
| ADDRESS | | | |
| POSTAL CODE | | | f |
| METROPOLIS-DISTRICT | KEN・TO・FU | | e |
| CITY-TOWN-VILLAGE | -SHI | | g |
| HOUSE NUMBER | -CHOME   -BAN | | h |

FIG.7

| FIELD NAME | TAG NAME |
|---|---|
| NAME FIELD | ⟨NAME⟩ |
| DATE FIELD | ⟨DATE⟩ |
| SEX FIELD | ⟨SEX⟩ |
| BIRTH-DATE FIELD | ⟨BIRTH-DATE⟩ |
| METROPOLIS-DISTRICT FIELD | ⟨METROPOLIS-DISTRICT⟩ |
| POSTAL CODE FIELD | ⟨POSTAL CODE⟩ |
| CITY-TOWN-VILLAGE FIELD | ⟨CITY-TOWN-VILLAGE⟩ |
| HOUSE NUMBER FIELD | ⟨HOUSE NUMBER⟩ |
| ⋮ | ⋮ |

| DATE : AUGUST 30, 1996 | | | |
|---|---|---|---|
| NAME | TOKKYO TARO | SEX | MALE |
| BIRTH-DATE | APRIL 29, 1958 | | |
| ADDRESS | | | |
| POSTAL CODE | 102−91 | | |
| METROPOLIS -DISTRICT | TOKYO   KEN • [TO] • FU | | |
| CITY-TOWN -VILLAGE | MITAKA-SHI, KAMIRENJAKU | | |
| HOUSE NUMBER | 1-23··· | | | a, b, c, d, e, f, g, h

FIG.10

```
〈APPLICATION FORM〉
〈DATE〉    AUGUST 30, 1996  〈/DATE〉
              ⋮
〈NAME〉    TOKKYO TARO  〈/NAME〉
〈SEX〉     MALE  〈/SEX〉
              ⋮
〈POSTAL CODE〉    102-91  〈/POSTAL CODE〉
〈METROPOLIS-DISTRICT〉    TOKYO  〈/METROPOLIS-DISTRICT〉
〈CITY-TOWN-VILLAGE〉    MITAKA-SHI  〈/CITY-TOWN-VILLAGE〉
〈TOWN-NAME〉    KAMIRENJAKU  〈/TOWN-NAME〉
〈HOUSE NUMBER〉    1-23  ⋯
              ⋮
```

FIG.11

METHOD AND APPARATUS FOR PROCESSING STANDARD GENERALIZED MARKUP LANGUAGE (SGML) AND CONVERTING BETWEEN SGML AND PLAIN TEXT USING A PROTOTYPE AND DOCUMENT TYPE DEFINITION

FIELD OF THE INVENTION

The present invention relates to method and apparatus for processing a standard generalized markup language document for converting a plain text document prepared by a user using a word processor or that sort of software to a standard generalized markup language document (hereafter SGML document), and to a computer-readable recording medium with a program making a computer execute the method stored therein.

BACKGROUND OF THE INVENTION

Conventionally, in a document processing apparatus such as a word processor or the like, for planning an interface between a software and the database, a mode for saving the data in a SGML format is provided. In a SGML document in compliance with the SGML-standard, the document structure is defined according to the document type definition (DTD).

For this reason, when preparing a SGML document according to the document structure specified by the document type definition, it is necessary to add tags indicating a structural element to each of the input items in a plain text document. Accordingly, tags are inputted generally by operating a keyboard.

However, with recent technological development in a related field, there has been proposed SGML converting techniques in which a previously prepared plain text document is analyzed by software for syntaxes and tags indicating a structural element are automatically added to each of the obtained syntaxes. Examples of the technique are disclosed, for instance, in Japanese Patent Laid-Open Publication No. HEI 5-101054, Japanese Patent Laid-Open Publication No. HEI 7-44560, and in Japanese Patent Laid-Open Publication No. HEI 8-221399.

In Japanese Patent Laid-Open Publication No. HEI 5-101054, there is disclosed a technology for marking up a text document according to pre-specified document type definition, dividing the marked up text document to components, storing the components in a database, retrieving desired components from the database when a document is to be prepared, and synthesizing the components obtained through the retrieval to obtain the desired document. Also, in the Japanese Patent Laid-Open Publication No. HEI 7-44560, there is disclosed a technology for obtaining a SGML document from a marked up text document prepared according to the SGML regulations, by generating a logical structure specific to that text document.

Also, in the Japanese Patent Laid-Open Publication No. HEI 8-221399, there is disclosed a technology for obtaining a SGML document by (1) referring to correspondence between temporary tags, indicating a pre-prepared logical structure of a text document specified by a user, and a plurality of document type definitions, (2) obtaining the degree of coincidence between the original text prepared by the user using the temporary tags and each of the document type definitions, and (3) selecting one of the document type definitions displayed in the order of the degree of the coincidence thereamong by the user.

In the conventional technology, as disclosed in the publications, to prepare a desired SGML document, preparation of samples such as components, marked-up texts, and document type definitions or the like, and processing such as retrieval of the samples, synthesis thereof, generation of a logical structure, and determination of the degree of coincidence thereamong or the like, is required. This processing style is suited for SGML conversion of a text with the form not fixed, however, in the case of text documents having specific form such as a form paper or the like, the workability is low. For this reason, improvement thereof has been expected in recent years.

SUMMARY OF THE INVENTION

It is an object of the present invention to obtain an apparatus for processing SGML document in which it is possible to improve workability of SGML conversion of a plain text document having a fixed form, a method for processing a SGML document for the same, and a computer-readable recording medium with a program making a computer execute the method stored therein.

The apparatus for processing SGML document according to the present invention generates a conversion form for conversion between a prototype document having a specific form and a document type definition by correlating structural elements in the prototype document to those in the document type definition respectively, and registers the generated conversion form so that it can be referred to when converting a plain text document prepared by using the prototype document is converted to a SGML document. For this reason a conversion form corresponding to the specific form may be generated only once, and since it is not required to prepare samples such as components, markup documents, and document type definitions every time as in the case of the conventional technology, it is possible to improve the workability thereof.

The apparatus for processing SGML document according to the present invention, generates a conversion table for conversion between a prototype document having a specific form and document type definition by correlating fields of the prototype document to tags of the document type definition, and registers the generated conversion table so that it can be referred to when converting a plain text document prepared by using the prototype document to a SGML document having tags. For this reason a conversion table corresponding to the specific form may be generated only once, and since it is not required to prepare that samples such as components, markup documents, and document type definition every time like in the case of the conventional technology, it is possible to improve the workability thereof.

The apparatus for processing SGML document according to the present invention, previously registers a conversion form in which structural elements in a prototype document are correlated to those in document type definition for conversion between the prototype document having a specific form and the document type definition, prepares a plain text document using the specific form, converts the prepared plain text document to a SGML document by referring to the registered conversion form, so that, if a conversion form corresponding to the specific form is generated once, a required work thereafter and on is only to prepare a plain text document in the specific form. For this reason, it is not required that samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with specific form to a SGML document.

The apparatus for processing SGML document according to the present invention, previously registers a conversion table in which fields of a prototype document is correlated to tags of document type definition for conversion between the prototype document having a specific form and the document type definition, prepares a plain text document using the specific form, and converts the prepared plain text document to a SGML document having tags by referring to the registered conversion table, so that, if a conversion table corresponding to the specific form is prepared once, a required work thereafter and on is only to prepare a plain text document in a specific form. For this reason it is not required that samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document.

In the apparatus for processing SGML document according to the present invention, a specific form has fields such as ruled lines, an application form, or form paper or the like, for inputting the data so that a user just inputs data into the fields without bothering to add tags thereto, which makes it possible to reduce the load on the user.

The apparatus for processing SGML document according to the present invention, further reconverts the plain text document from the SGML document by referring to the registered conversion table, so that it is possible to realize a two-directional conversion between a plain text document and a SGML document with higher workability in case of documents having a specific form.

The method for processing SGML document according to the present invention comprises steps for generating a conversion table for conversion between a prototype document having a specific form and document type definition by correlating the field of the prototype document with the tags of the document type definition, and registering therein the generated conversion table so that it can be referred to when a plain text document prepared by using the prototype document is converted to a SGML document having tags. For this reason a conversion table corresponding to the specific form may be generated only once, and since it is not required to prepare samples such as components, markup documents, and document type definitions every time like in the case of the conventional technology, it is possible to improve the workability thereof.

The method for processing SGML document according to the present invention comprises steps for previously registering a conversion table correlating fields of a prototype document with tags of document type definition for conversion between a prototype document having a specific form and the document type definition, preparing a plain text document using the specific form, converting the prepared plain text document to a SGML document having tags by referring to the registered conversion table, and converting in reverse the converted SGML document to the plain text document by referring to the registered converting table, so that, if a conversion table corresponding to the specific form is generated once, a required work thereafter and on is only to prepare a plain text document in a specific form. For this reason, it is not required to prepare samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document and it is also possible to realize a two-directional conversion between a plain text document and a SGML document with higher workability in preparation of a document having a specific form.

The recording medium according to the present invention stores therein a program for making a computer execute the steps described above, whereby the program becomes machine-readable, and with this feature, operations in the steps can be realized by a computer.

Other objects and features of this invention will become clear from the following description with reference to the accompanying drawings.

DESCRIPTION OF THE PREFERRED EMBODIMENTS

Detailed description is made hereinafter for preferred embodiments of the method and apparatus for processing SGML, and a computer-readable recording medium with a program making a computer execute the method stored therein with reference to the related drawings.

Figure 1:
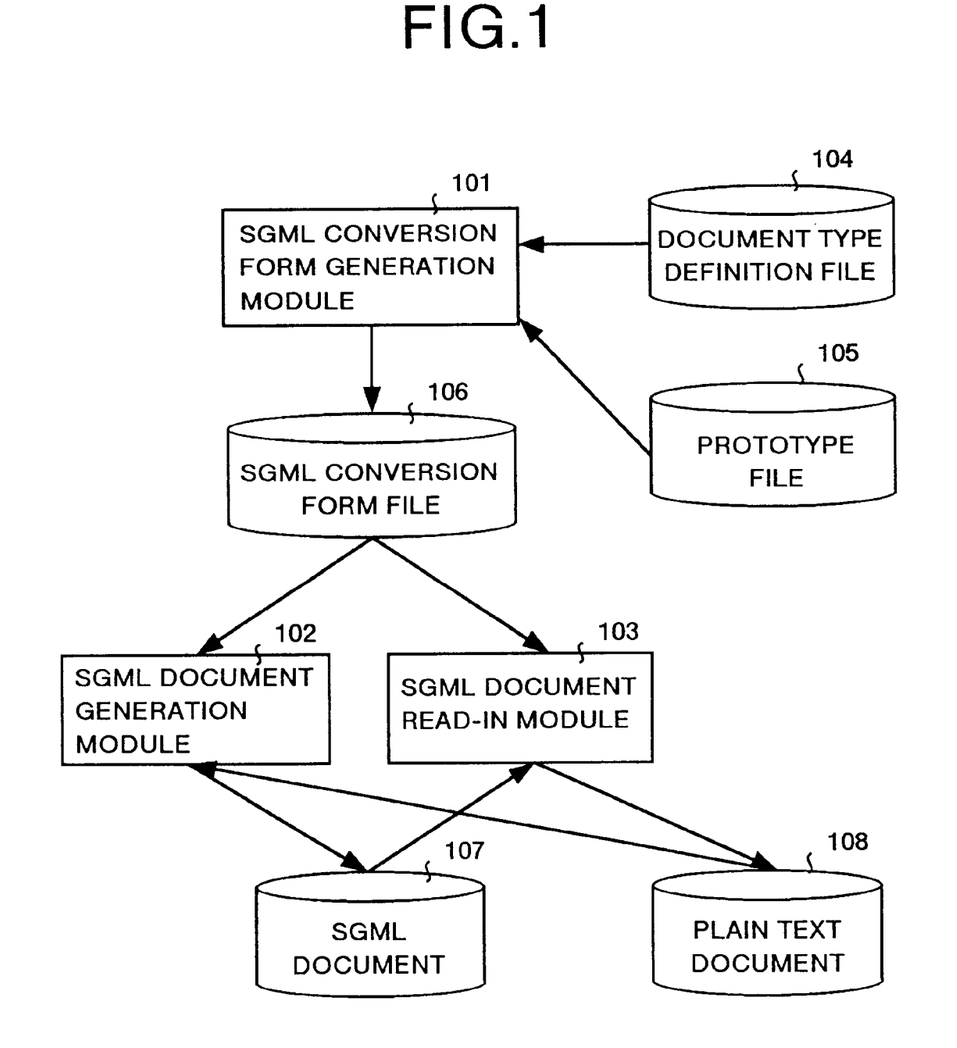
FIG. 1 is a block diagram illustrating functional features of the apparatus for processing SGML document according to an embodiment of the present invention.

At first, a description is provided of the basic change principles of the invention. FIG. 1 is a block diagram illustrating functional features of the apparatus for processing SGML document according to an embodiment of the present invention. This apparatus for processing SGML document comprises, as shown in FIG. 1, a SGML conversion form generation module 101, a SGML document generation module 102, and a SGML document read-in module 103.

The SGML conversion form generation module 101 generates a SGML conversion form file 106 for conversion between a document type definition file 104 and a prototype file 105 correlating structural elements of the document type definition file 104 to those of the prototype file 105 based on a plain text document respectively. The SGML document generation module 102 refers to the SGML conversion form file 106 to generate a SGML document 107 from a plain text document 108 prepared by a user. The SGML document read-in module 103 refers to the SGML conversion form file 106 to generate a plain text document 108 from a SGML document already generated by the SGML document generation module 102.

Figure 2:
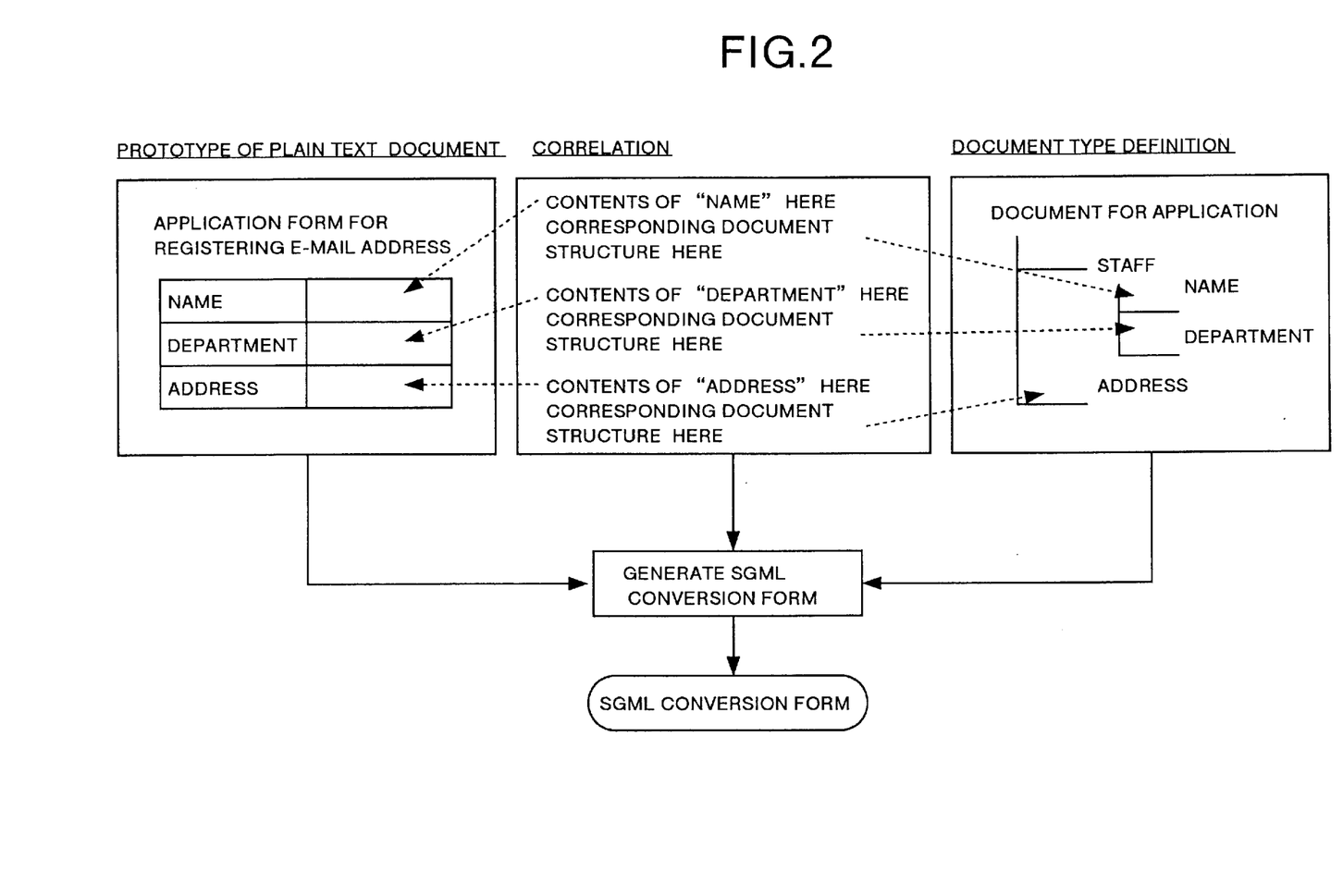
FIG. 2 is a view for illustrating the principles of the operations involved in the preparation of a SGML conversion form according to the embodiment.

Next, a description is made of principles of preparing the SGML conversion form file 106. FIG. 2 is a view for illustrating the principles of the operations involved in the preparation of a SGML conversion form file according to the embodiment. Preparation of this SGML conversion form file 106 is one of the jobs performed by the SGML conversion form generation module 101. Three types of information, as shown in FIG. 2, such as a prototype of a plain text document(prototype file 105), document type definition (document type definition file 104), and data correlating these files with each other is required for preparation of a SGML conversion form.

The three types of information can be obtained from interactive operations between a computer and a user, by using a user interface, through input means such as a keyboard or the like as well as through a data display means responding to the input. A SGML conversion form is prepared on the basis of a relation among those three types of information. The generated SGML conversion form realizes two-directional conversion between a plain text document and a SGML document by correlating the prototype with the document type definition.

The example in FIG. 2 shows, as a prototype of a plain text document, an application form for registering an e-mail address(described as an application form hereinafter). Provided in this application form are fields for name, department, address (indicating an e-mail address). A user just inputs data in the form of character string(name, department, address) into each of the fields thereof, to prepare a plain text document.

It is necessary to show what structure each of the fields for name, department, and address have in the document type definition in order to generate a SGML conversion form relating to this application form. For instance, in the case of name, by defining a field in the prototype (application form) that should correspond to the field for the name in the document type definition, it is possible to obtain data for correlation between the application form and the document type definition.

Similarly, by correlating a corresponding document structure in the document type definition with each of the fields for department and address respectively, it is possible to obtain data for correlation therebetween. Finally, by correlating an application form and the document type definition to data for correlation therebetween as one unit, a SGML conversion form is prepared.

The next description concerns the principles of conversion between a plain text document and a SGML document.

Figure 3:
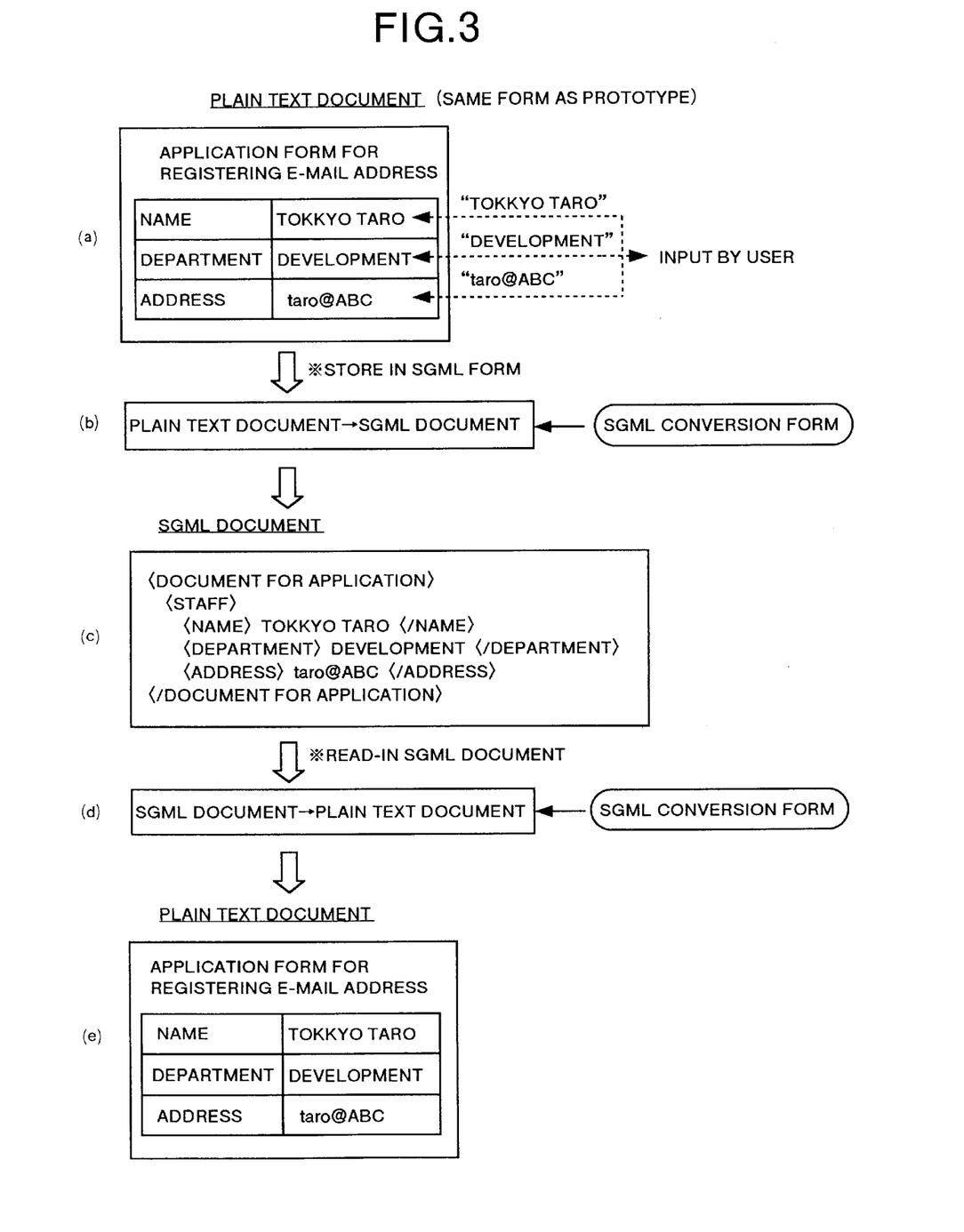
FIG. 3 is a view for illustrating the principles of the operations involved in the conversion between a plain text document and a SGML document according to the embodiment.

FIG. 3 is a view for illustrating the principles of the operations involved in the conversion between a plain text document and a SGML document according to the embodiment. The conversion from a plain text document 108 having a prototype form to a SGML document 107 is one of the jobs performed by the SGML document generation module 102. On the other hand, the reverse conversion from the SGML document 107 to the plain text document 108 is one of the jobs performed by the SGML document read-in module 103.

The SGML conversion form file 106 is required for the conversion and the reverse conversion. That is for the conversion of a plain text document having a specific form to a SGML document, and for the conversion of the SGML document to a plain text document having a specific form as in the case of an application shown in FIG. 2.

Description is made for a case where SGML conversion is executed by actually inputting concrete data into the application form shown in FIG. 2 with reference to FIG. 3. The application form displayed on a display has, as shown in FIG. 2, fields for inputting name, department, and address. For instance, when "TOKKYO Taro" is inputted into the name field by a user through a user interface, "Development" into the department field, and "taro@ABC" into the address field respectively, each of the data is displayed on each of the fields(refer to FIG. 3(a)).

When data input is over and an instruction for conversion of the data to a SGML document is given by the user, the application form is converted to a SGML document. In the process, the SGML conversion form file 106 generated beforehand is referred to, and a position of a document structure corresponding to each of the fields in the application form is found out from the document type definitions. Then the data inputted into each of the fields is set in a position for the corresponding document structure (FIG. 3(b)).

More specifically, because the SGML document is one having tags, a position for a document structure corresponding to each of the fields is a position at which a tag corresponding to the field is provided. Accordingly, as shown in FIG. 3(c), the data "TOKKYO Taro" inputted in the name field is set in the position in between <Name> and </Name> tags, "Development" inputted in the position field is set in the position in between <Department> and </Department> tags, and "taro@ABC" inputted in the address field is set in the position in between <Address>and </Address> tags. As a result, a SGML document is generated.

The SGML document obtained by converting the data thereto as shown in FIG. 3(c) can also be reconverted to the original plain text document. In this case, the way of referring to the SGML conversion form file 106 is executed in reverse order to that as described above. Namely, the generated SGML conversion form file 106 is referred to, and at first, each of the document structures on the SGML document, namely a position for each of the fields corresponding to each tag is found out from the prototype file. Then data set to each tag is set in the corresponding field(FIG. 3(d)).

More specifically, because the plain text document is the one having a specific fields, a position on the prototype corresponding to each tag is a position for each of the fields. Accordingly, as shown in FIG. 3(e), the data "TOKKYO Taro" set in the position in between <Name> and </Name> tags in the application form is set in the name field, "Development" set in the position in between <Department> and </Department> tags is set in the department field, and "taro@ABC" set in the position in between <Address> and </Address> tags is set in the address field. As a result, the SGML document is reconverted to the plain text document.

Figure 4:
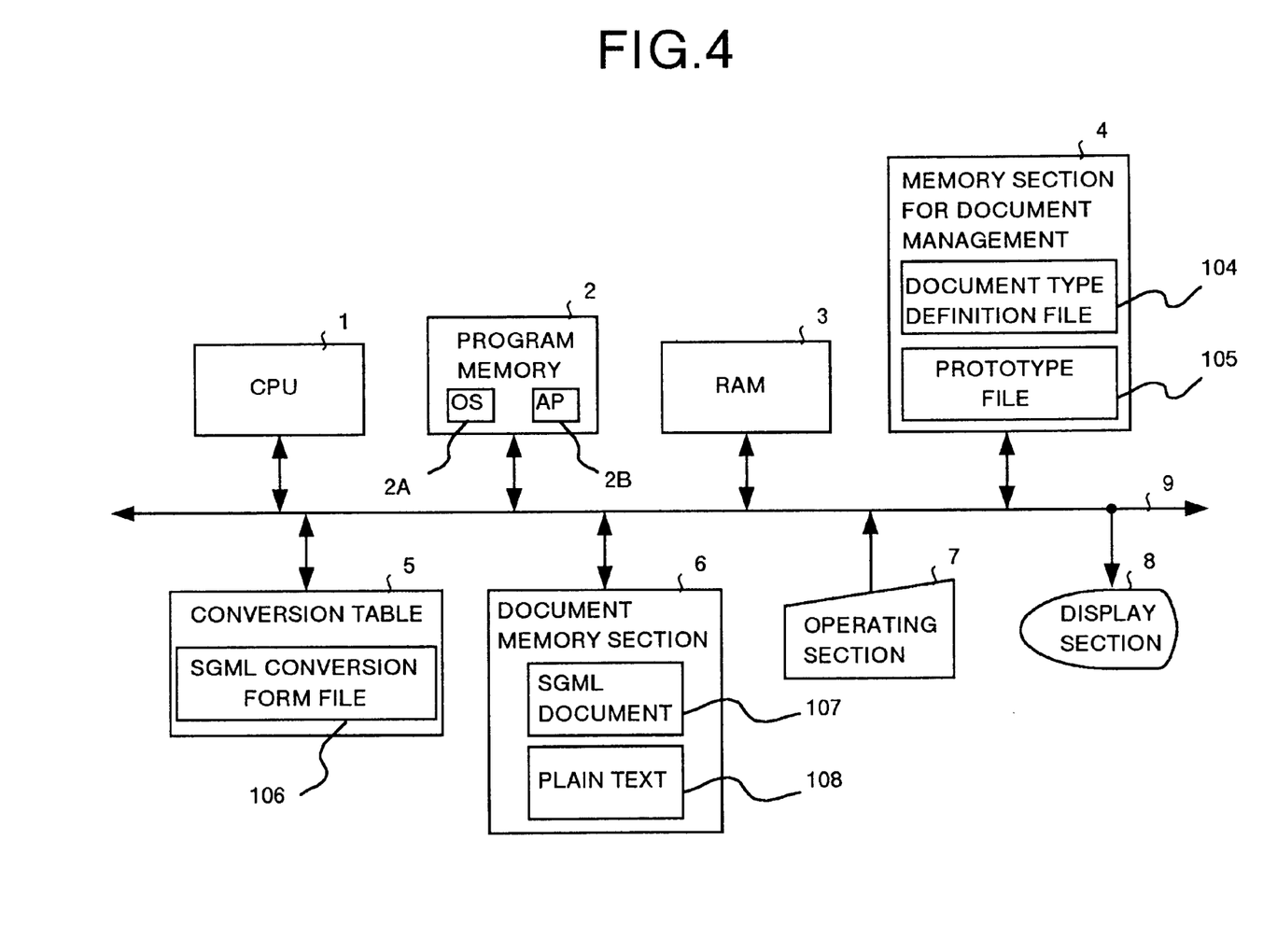
FIG. 4 is a block diagram showing the hardware of the apparatus for processing SGML document according to the embodiment.

Herein, an example of the hardware configuration of the apparatus for processing SGML document is explained. FIG. 4 is a block diagram showing the hardware of the apparatus for processing SGML document according to the embodiment. The SGML document processing apparatus comprises, as shown in FIG. 4, units such as a CPU 1, a program memory 2 connected to said CPU 1 by an internal bus 9, a RAM 3, a memory section 4 for document management, a conversion table 5, a document memory section 6, an operating section 7, and a display section 8. It should be noted that the internal bus 9 is a transmission line for control signals, data, and address signals or the like.

The CPU 1 is a unit for controlling operations of the entire apparatus according to various programs stored on the program memory 2. Namely, the CPU 1 controls the execution of the various programs stored on the program memory 2, read/write of data from/in the RAM 3, read/write of data from/in the memory section 4 for document management or document memory section 6, receipt of key entry from the operating section 7, and display on the display section 8 or the like.

The program memory 2 stores thereon operating system OS2A, application program AP2B, and various types of parameters required for the operations of the CPU 1 or the like. Included in the application program AP2B are programs for realizing each function of the SGML conversion form generation module 101, SGML document generation module 102, and SGML document read-in module 103. The RAM 3 is used as a work area when the CPU 1 is in operation.

The memory section 4 for document management stores therein the document type definition file 104 and the prototype file 105. This memory section 4 for document management can change the contents registered in the document definition file 104 and the prototype file 105 or adds contents thereto. The conversion table 5 converts the SGML conversion form file 106 to the table to be registered therein. Not only the SGML conversion form file 106 but also a plurality types of conversion form can be registered in this conversion table 5. The document memory section 6 stores therein the SGML document 107 and plain text document 108.

The operating section 7 is a unit that plays a role of a user interface and has keys and switches for instructing, through key entry, operations for generation of a SGML conversion form, generation of a SGML document, and read-in of a SGML document or the like. The display section 8 displays data when each of the functions of the SGML document conversion form generation module 101, SGML document generation module 102, and SGML document read-in module 103 is performed according to the control by the CPU 1.

Figure 5:
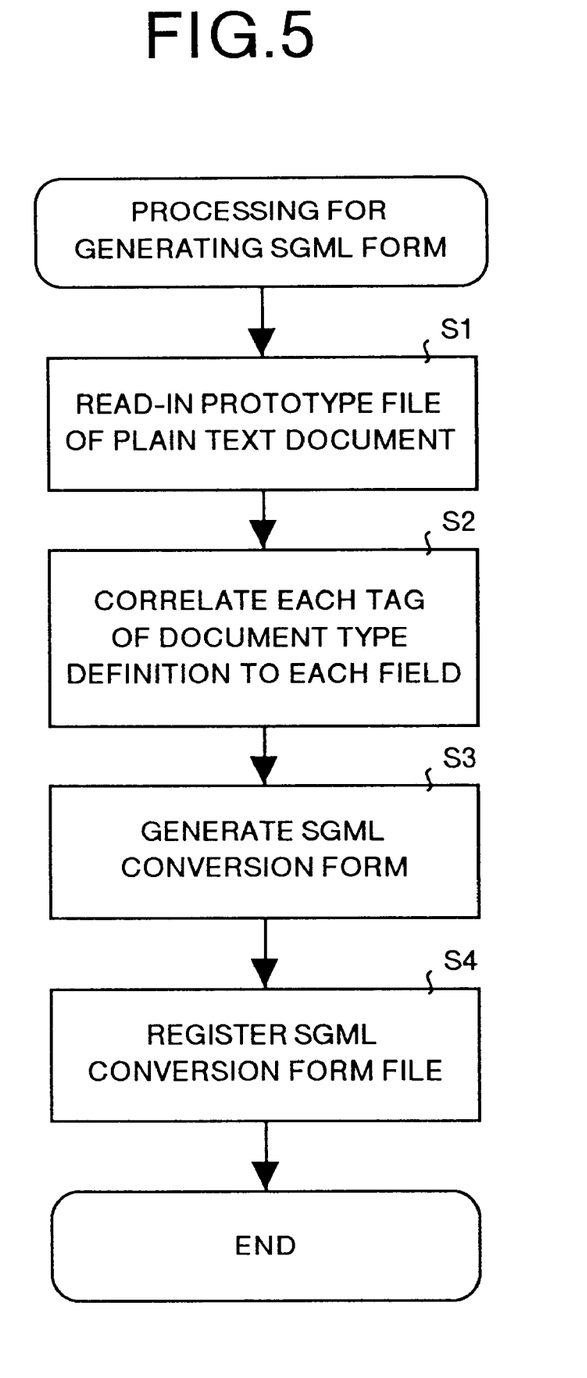
FIG. 5 is a flow chart for illustrating the processes involved in the generation of a SGML conversion form according to the embodiment.
Figure 6:
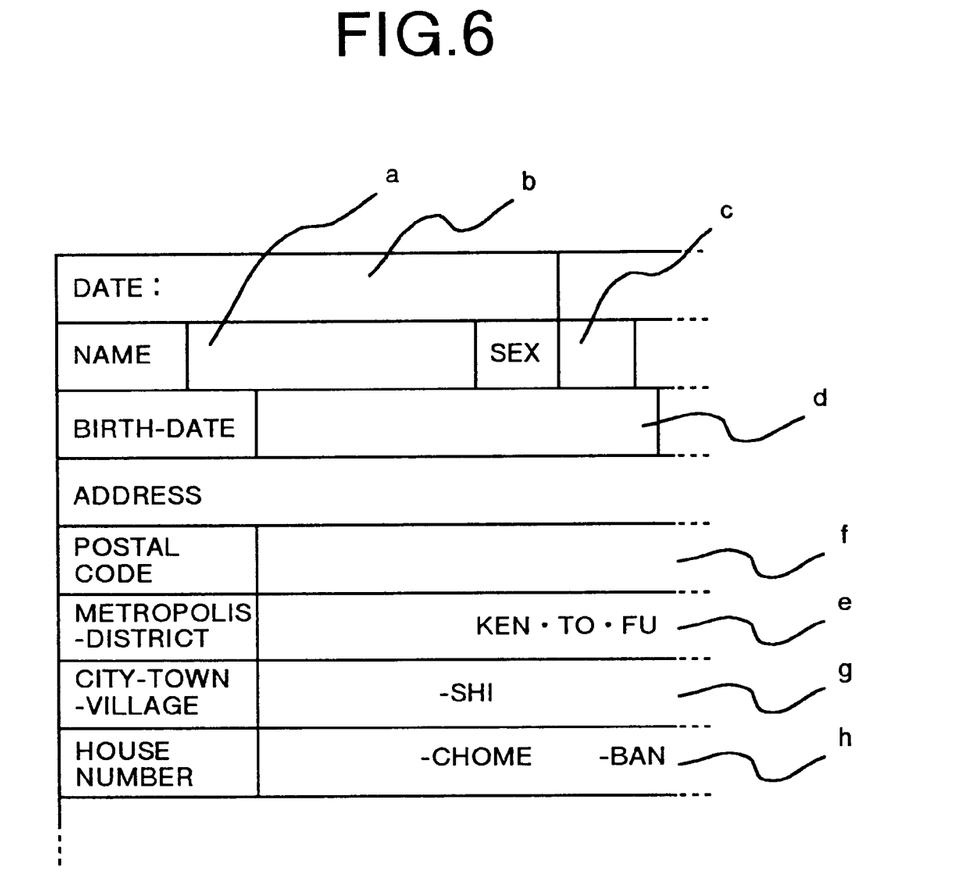
FIG. 6 is a view showing an example of a prototype document having a specific form in the embodiment.

The next description concerns operations involved in the of generation of a SGML conversion form by using the hardware configuration shown in FIG. 4. FIG. 5 is a flowchart for explaining processes involved in the generation of a SGML conversion form according to the embodiment, FIG. 6 is a view showing an example of a prototype document having a specific form in the embodiment, and FIG. 7 is a view showing an example of a conversion table according to the embodiment.

The description assumes hereinafter a prototype form for an application form shown in FIG. 6 as one example of a specific form used for ruled lines, an application form, or form paper or the like. At first, an application form which is a prototype form for a plain text document is prepared by inputting characters and ruled lines according to the operating section 7 through display on the display section 9 (step S1). This application comprises a plurality of fields from a to h. These fields are allocated along the ruled lines. In the figure, designated at the reference letter a is a name field, at b is a date field, at c is a sex field, at d is a birth-date field, at e is a metropolis-district field, at f is a postal code field, at g is a city-town-village field, and at h is a house number field respectively.

When preparation of the prototype form of the application form is finished in step S1, the prototype form thereof is registered in the memory section 4 for document management as a prototype file 105. Further, each of the fields a to h is correlated to each tag of the document type definition along the prototype form on the display through key operations by the operating section 7. Document type definitions and data correlated thereto are prepared through the operation for correlation(step S2).

Figure 7:
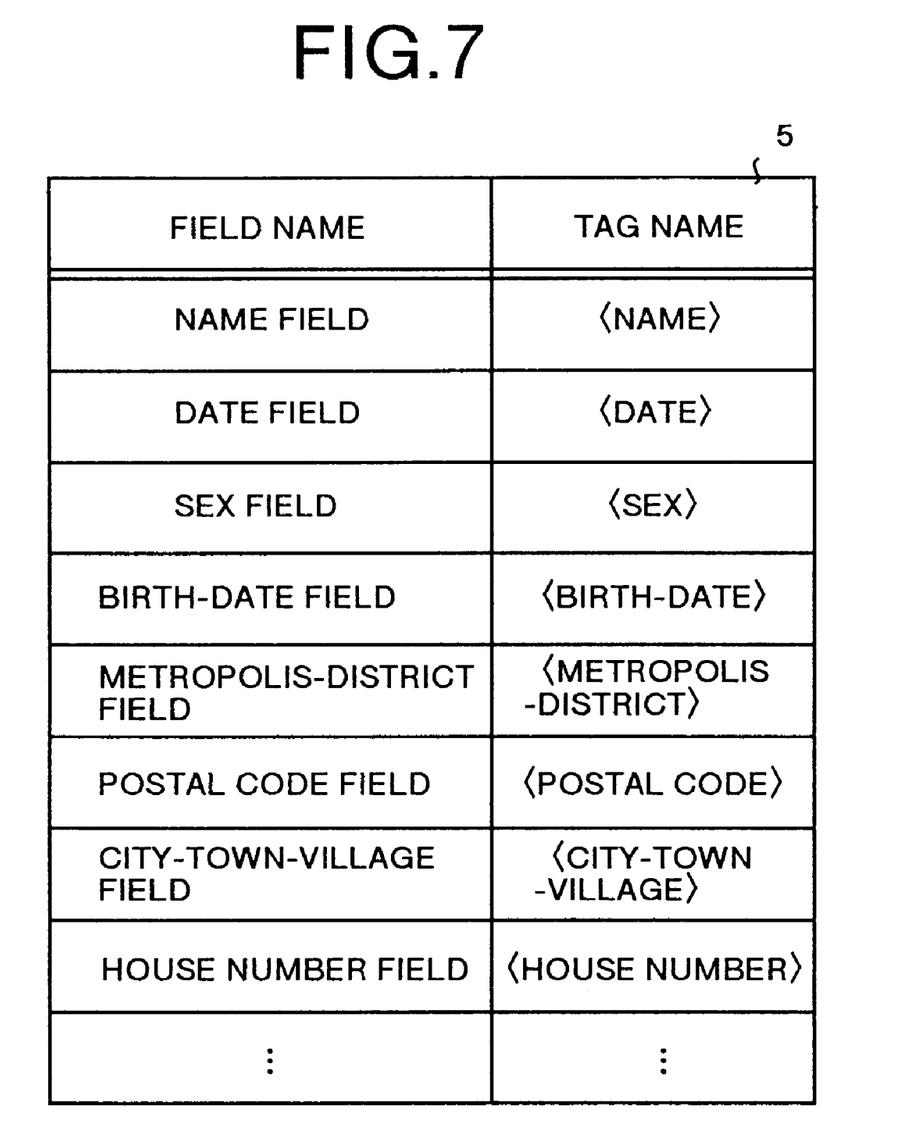
FIG. 7 is a view showing an example of a conversion table according to the embodiment.

As a result, as shown in FIG. 7, the SGML conversion form is prepared in which each of tags is correlated to each of the fields such as, a tag <Name> to the name field, a tag <Date> to the data field, a tag <Sex> to the sex field, a tag <Birth-date> to birth-date field, a tag <Metropolis-district> to the metropolis-district field, a tag <Postal code> to the postal code field, a tag <City-town-village> to the city-town-village field, and a tag <House number> to the house number field respectively(step S3). Further, this SGML conversion form is registered in the conversion table 5 as a file (step S4).

Figure 8:
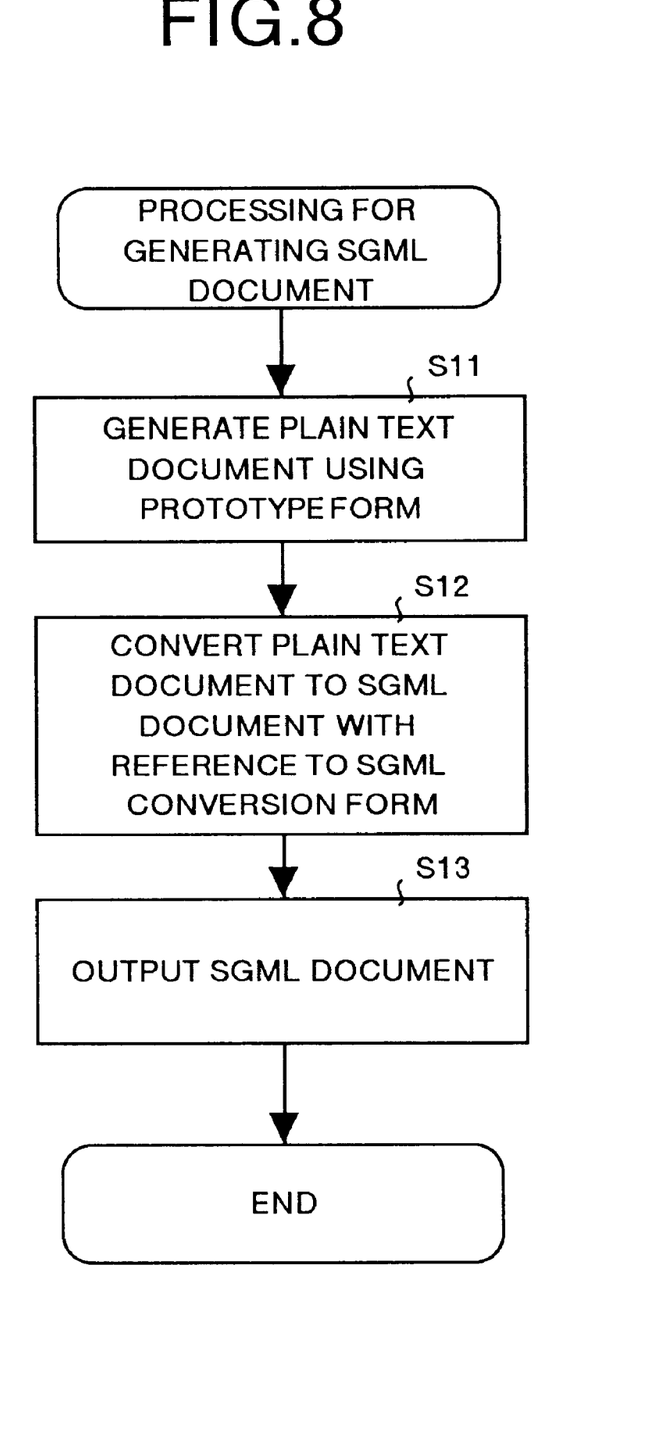
FIG. 8 is a flow chart for illustrating the processes involved in the generation of a SGML document according to the embodiment.

Then, description is made for operations involved in the generation of a SGML document. FIG. 8 is a flow chart showing a processing sequence in generation of a SGML document according to the embodiment, FIG. 9 is a view showing an example of a plain text document in the embodiment, and FIG. 10 is a view showing an example of a SGML document in the embodiment.

Since a SGML conversion form is used in the generation of the SGML document, it is necessary that the SGML conversion form is registered in the conversion table 5 beforehand. Accordingly, a desired prototype form is first read out from the prototype file 105 registered in the memory section 4 for document management, and then the plain text document is prepared.

For example, in a case where a prototype form for an application shown in FIG. 6 is read out, the prototype form is displayed on the display screen of the display section 8, so that a user may input desired data in each of the fields by operating the operating section 7. The plain text document can easily be prepared through the operations (step S11). When each data is inputted in each of the fields as described below, the plain text document is prepared as shown in FIG. 9, for instance, "TOKKYO Taro" in the name field a, "August 30th, 1996" in the date field b, "Male" in the sex field c, "April 29th, 1958" in the birth-date field d, "Tokyo-to" in the metropolis-district field e, "102-91" in the postal code field f, "Mitaka-shi" in the city-town-village field g, and "1-23 . . . " in the house number field h.

Figure 9:
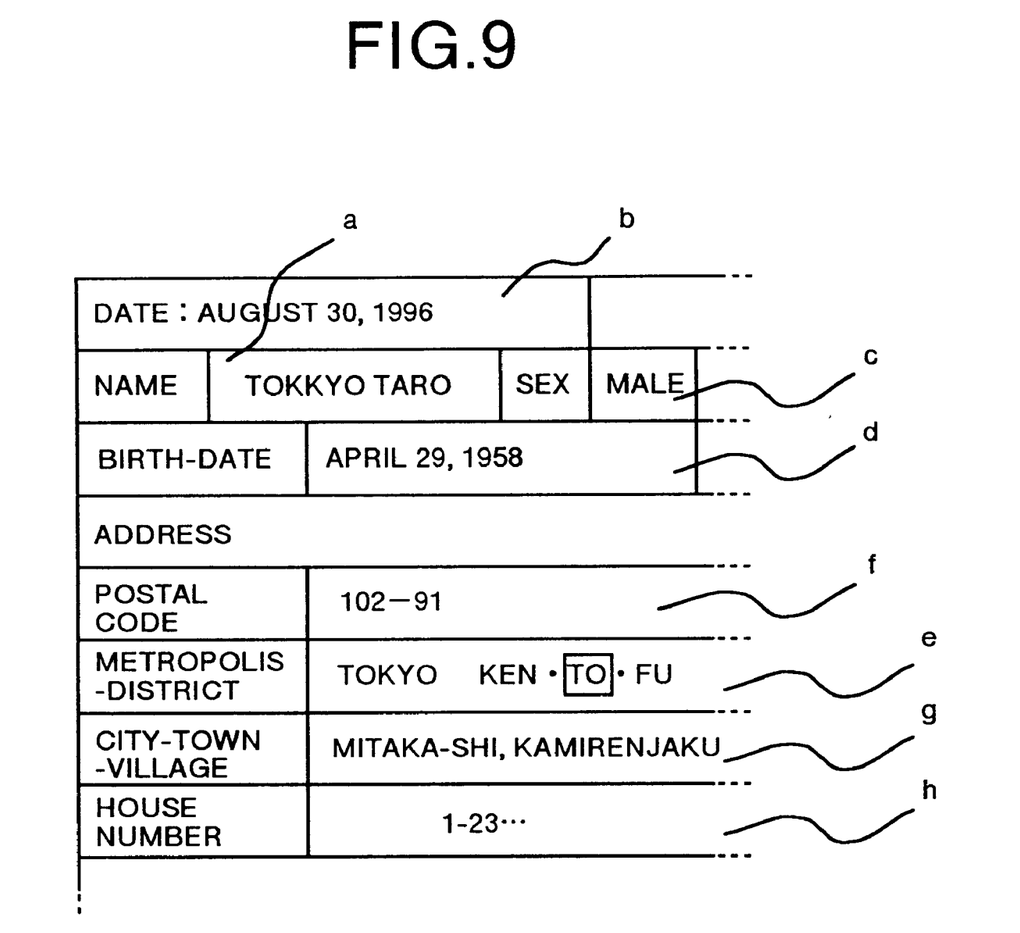
FIG. 9 is a view showing an example of a plain text document in the embodiment.
Figure 10:
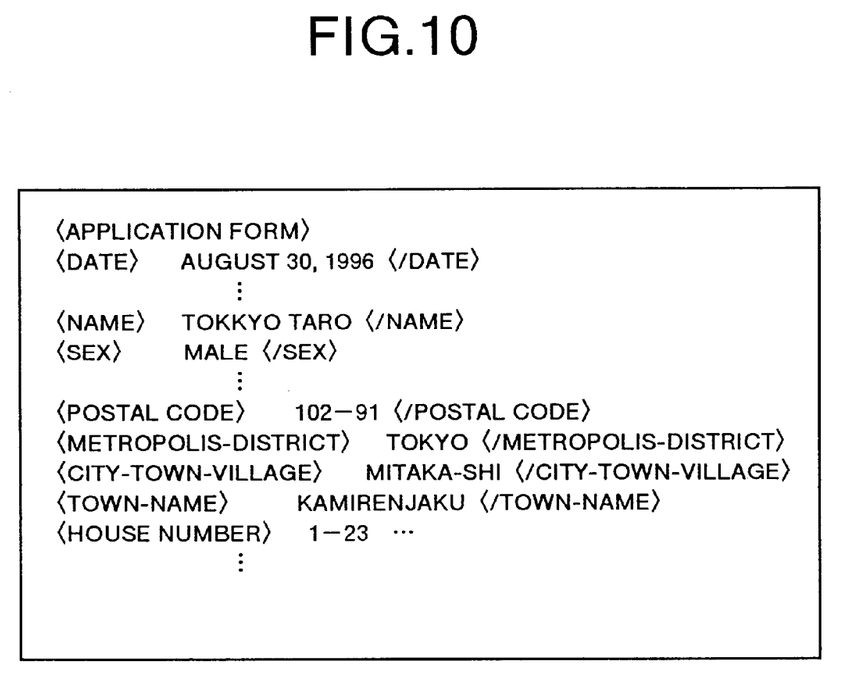
FIG. 10 is a view showing an example of a SGML document in the embodiment.

Then, by referring to the conversion form relating to this application form namely the SGML conversion form file 106 (the format in FIG. 7) registered in the conversion form 5, the plain text document shown in FIG. 9 is converted to the SGML document shown in FIG. 10. Namely, along the SGML conversion form file 106, "TOKKYO Taro" in the name field a is set to a space between tags <Name> and </Name>, then "August, 30th, 1996" in the date field b to a space between tags <Date> and </Date>, "Male" in the sex field c to a space between tags <Sex> and </Sex>, "April 29th, 1958" in the birth-date field d to a space between tags <Birth-date> and </Birth-date>, "Tokyo-to" in the metropolis-district field e to a space between tags <Metropolis-district> and </Metropolisdistrict>, "102-91" in the postal code field f to a space between tags <Postal code> and </Postal code>, "Mitaka-shi" in the city-town-village field g to a space between tags <City-town-village> and </City-town-village>, and "1-23 . . . " in the house number field h to a space between tags <House number> and </House number> respectively.

The SGML document generated as described above is registered in (outputted to) the document memory section 6 together with the corresponding plain text document, and in addition, the document can be displayed on the display section 8 according to the instruction from the user(step S13).

Figure 11:
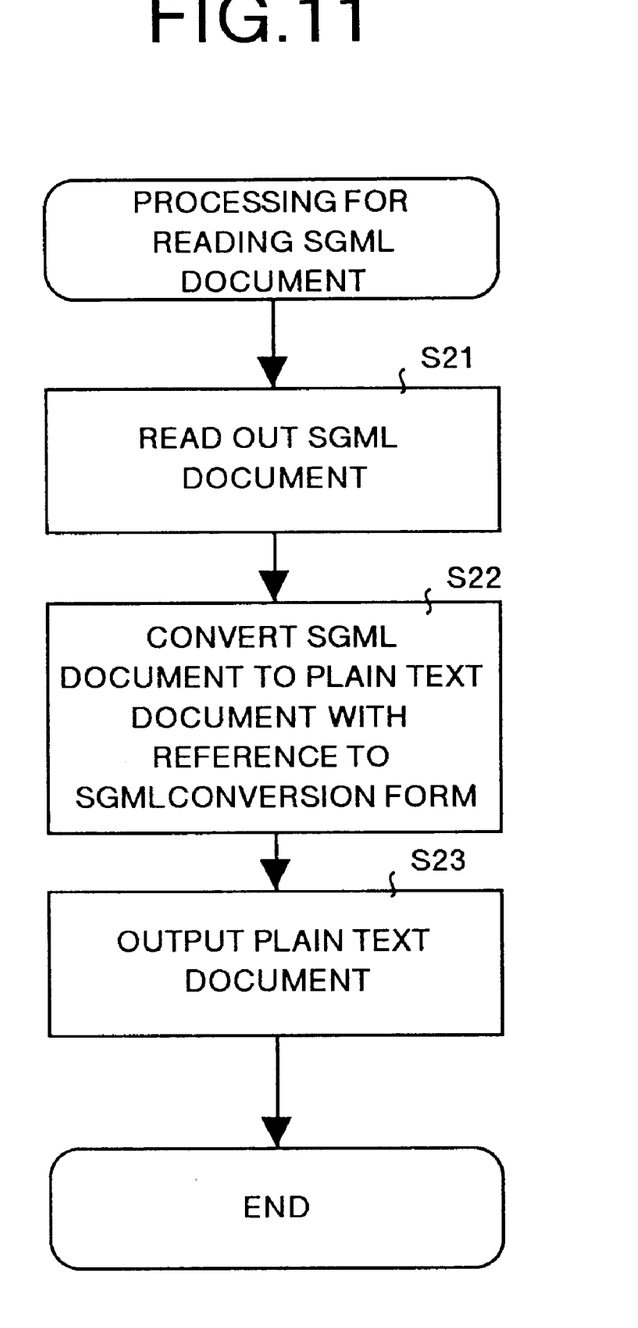
FIG. 11 is a flow chart for illustrating the processes involved in reading in of a SGML document according to the embodiment.

Further, description is made for operations involved in the reading of a SGML document. FIG. 11 is a flow chart for illustrating the processes involved in the reading of a SGML document according to the embodiment. This operation for reading a SGML document is also a processing for converting in reverse from a SGML document the plain text document. Namely, the above operation indicates that the user accesses the document memory section 6 by operating the operating section 7 to select a desired SGML document, and then the SGML document is read out(step S21). With this operation, the SGML document displayed on the display section 8 is a SGML document in which tags are arranged on both the sides of every data as shown in FIG. 10.

In a case where the user selects the SGML document in FIG. 10 and instructs the reverse conversion thereof by operating the operating section 7, by referring to the conversion form relating to the SGML document namely the SGML conversion form file 106 (the format in FIG. 7) having already been registered in the conversion table 5, the reverse conversion from the SGML document shown in FIG. 10 to the plain text document shown in FIG. 9 is executed (step S22). The specific way of conversion is supposed to be clear from the principles as described above, so that description thereof is omitted herein. As a result, the plain text document obtained by the reverse conversion is displayed on the display section 8(step S23).

As described above, with this embodiment, the apparatus for processing SGML document generates a conversion table 5 for conversion between a prototype document having a specific form and document type definition by correlating fields of the prototype document to tags of the document type definition, and registers the generated conversion table 5 so that it can be referred to when converting a plain text document prepared by using the prototype document to a SGML document having tags. For this reason a conversion table 5 corresponding to the specific form may be generated only once, and since it is not required to prepare samples such as components, markup documents, and document type definitions every time as in the case of the conventional technology it is possible to improve the workability thereof.

The apparatus for processing SGML document previously registers a conversion table 5 correlating fields of a prototype document to tags of document type definition for conversion between the prototype document having a specific form and the document type definition, prepares a plain text document using the specific form, and converts the prepared plain text document to a SGML document having tags by referring to the registered conversion table 5, so that, if a conversion table 5 corresponding to the specific form is prepared once, required work thereafter and on is only to prepare a plain text document in a specific form. For this reason it is not required that samples such as components, markup documents, and document type definitions are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document.

In the apparatus for processing SGML document, a specific form has fields such as ruled lines, an application form, or form paper or the like, for inputting the data so that a user just inputs data into the fields without bothering to add tags thereto, which makes it possible to reduce the load on the user.

The SGML document processing apparatus converts in reverse the converted SGML document to the plain text document by referring to the registered conversion table 5, so that it is possible to realize two-directional conversion between a plain text document and a SGML document with higher workability in preparation of a document using a specific form.

As described above, the apparatus for processing SGML document according to the present invention generates a conversion form for conversion between a prototype document having a specific form and a document type definition by correlating structural elements in the prototype document to those in the document type definition respectively, and registers the generated conversion form so that it can be referred to when converting a plain text document prepared by using the prototype document is converted to a SGML document. For this reason a conversion form corresponding to the specific form may be generated only once, and since it is not required to prepare samples such as components, markup documents, and document type definitions every time as in the case of the conventional technology, it is possible to improve the workability thereof.

The apparatus for processing SGML document according to the present invention, generates a conversion table for conversion between a prototype document having a specific form and document type definition by correlating fields of the prototype document to tags of the document type definition, and registers the generated conversion table so that it can be referred to when converting a plain text document prepared by using the prototype document to a SGML document having tags. For this reason a conversion table corresponding to the specific form may be generated only once, and since it is not required to prepare that samples such as components, markup documents, and document type definition every time like in the case of the conventional technology, it is possible to improve the workability thereof.

The apparatus for processing SGML document according to the present invention, previously registers a conversion form in which structural elements in a prototype document are correlated to those in document type definition for conversion between the prototype document having a specific form and the document type definition, prepares a plain text document using the specific form, converts the prepared plain text document to a SGML document by referring to the registered conversion form, so that, if a conversion form corresponding to the specific form is generated once, a required work thereafter and on is only to prepare a plain text document in the specific form. For this reason, it is not required that samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document.

The apparatus for processing SGML document according to the present invention, previously registers a conversion table in which fields of a prototype document are correlated to tags of document type definition for conversion between the prototype document having a specific form and the document type definition, prepares a plain text document using the specific form, and converts the prepared plain text document to a SGML document having tags by referring to the registered conversion table, so that, if a conversion table corresponding to the specific form is prepared once, a required work thereafter and on is only to prepare a plain text document in a specific form. For this reason it is not required that samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document.

In the apparatus for processing SGML document according to the present invention, a specific form has fields such as ruled lines, an application form, or form paper or the like, for inputting the data so that a user just inputs data into the fields without bothering to add tags thereto, which makes it possible to reduce the load on the user.

The apparatus for processing SGML document according to the present invention, further reconverts the plain text document from the SGML document by referring to the registered conversion table, so that it is possible to realize a two-directional conversion between a plain text document and a SGML document with higher workability in case of documents having a specific form.

The method for processing SGML document according to the present invention comprises steps for generating a conversion table for conversion between a prototype document having a specific form and document type definition by correlating the field of the prototype document with the tags of the document type definition, and registering therein the generated conversion table so that it can be referred to when a plain text document prepared by using the prototype document is converted to a SGML document having tags. For this reason a conversion table corresponding to the specific form may be generated only once, and since it is not required to prepare samples such as components, markup documents, and document type definitions every time like in the case of the conventional technology, it is possible to improve the workability thereof.

The method for processing SGML document according to the present invention comprises steps for previously registering a conversion table correlating fields of a prototype document with tags of document type definition for conversion between a prototype document having a specific form and the document type definition, preparing a plain text document using the specific form, converting the prepared plain text document to a SGML document having tags by referring to the registered conversion table, and converting in reverse the converted SGML document to the plain text document by referring to the registered converting table, so that, if a conversion table corresponding to the specific form is generated once, a required work thereafter and on is only to prepare a plain text document in a specific form. For this reason, it is not required to prepare samples such as components, markup documents, and document type definition are prepared every time like in the case of the conventional technology for execution of processing such as retrieval of the samples, synthesis thereof, generation of a logical structure, and determination of the degree of coincidence thereamong or the like, which makes it possible to improve the workability for conversion from a plain text document with a specific form to a SGML document and it is also possible to realize a two-directional conversion between a plain text document and a SGML document with higher workability in preparation of a document having a specific form.

The recording medium according to the present invention stores therein a program for making a computer execute the steps described above, whereby the program becomes machine-readable, and with this feature, operations in these steps can be realized with a computer.

This application is based on Japanese patent application No. HEI 9-118257 filed in the Japanese Patent Office on May 8, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for processing SGML document comprising:
   a conversion form generation unit for generating a conversion form for conversion between a prototype document and document type definition by correlating structural elements in said prototype document to those in said document type definition respectively; and
   a registration unit for registering the conversion form generated by said conversion form generation unit so that it can be referred to when a plain text document prepared by using said prototype document is converted to a SGML document.

2. An apparatus for processing SGML document comprising:
   a conversion table generation unit for generating a conversion table for conversion between a prototype document and document type definition by correlating fields of said prototype document having a specific form with tags of said document type definition; and
   a registration unit for registering the conversion table generated by said conversion table generation unit so that it can be referred to when a plain text document prepared by using said prototype document is converted to a SGML document having tags.

3. An apparatus for processing SGML document comprising:
   a registration unit for previously registering a conversion form correlating structural elements in a prototype document to those in document type definition for conversion between said prototype document having a specific form and said document type definition;

a preparation unit for preparing a plain text document using the specific form; and a conversion unit for converting the plain text document prepared by said preparation unit to a SGML document by referring to the conversion form registered in said registration unit.

4. An apparatus for processing SGML document comprising:

a registration unit for previously registering a conversion table correlating fields of a prototype document with tags of document type definition for conversion between said prototype document having a specific form and said document type definition;

a preparation unit for preparing a plain text document using the specific form; and a conversion unit for converting the plain text document prepared by said preparation unit to a SGML document having tags by referring to the conversion table registered in said registration unit.

5. An apparatus for processing SGML document according to claim 2; wherein said specific form has fields such as ruled lines, application form, or form paper or the like for inputting the data.

6. An apparatus for processing SGML document according to claim 4; wherein said specific form has fields such as ruled lines, application form, or form paper or the like for inputting the data.

7. An apparatus for processing SGML document according to claim 4 further comprising:

a reverse conversion unit for reconverting the SGML document converted by said conversion unit to the plain text document by referring to the conversion table registered by said registration unit.

8. A method for processing SGML document comprising:

a conversion table generation step for generating a conversion table for conversion between a prototype document and document type definition by correlating fields of said prototype document having a specific form to tags of said document type definition; and a registration step of registering therein the conversion table generated in said conversion table generation step so that it can be referred to when a plain text document prepared by using said prototype document is converted to a SGML document having tags.

9. A method for processing SGML document comprising:

a preparation step of preparing a plain text document using a specific form;

a conversion step of converting the plain text document prepared in said preparation step to a SGML document having tags by referring to the conversion table for conversion between a prototype document having a specific form and document type definition correlating fields of said prototype document with tags of said document type definition; and a reverse conversion step for reconverting the SGML document converted in said conversion step to the plain text document by referring to said conversion table.

10. A computer-readable recording medium storing therein a program making a computer execute said method according to a method for processing SGML document comprising a conversion table generation step for generating a conversion table for conversion between a prototype document and document type definition by correlating fields of said prototype document having a specific form to tags of said document type definition, and a registration step of registering therein the conversion table generated in said conversion table generation step so that it can be referred to when a plain text document prepared by using said prototype document is converted to a SGML document having tags.

11. A computer-readable recording medium storing therein a program making a computer execute said method according to a method for processing SGML document comprising a preparation step of preparing a plain text document using a specific form, a conversion step of converting the plain text document prepared in said preparation step to a SGML document having tags by referring to the conversion table for conversion between a prototype document having a specific form and document type definition correlating fields of said prototype document with tags of said document type definition, and a reverse conversion step for reconverting the SGML document converted in said conversion step to the plain text document by referring to said conversion table.

* * * * *